United States Patent

Hsueh

(10) Patent No.: US 6,821,670 B2
(45) Date of Patent: Nov. 23, 2004

(54) MOBILE PHONE BATTERY

(75) Inventor: Chih-Yuan Hsueh, Tauyuan Hsien (TW)

(73) Assignee: Chang Hsiang Industrial Co., LTD, Taoyuan (TW)

( * ) Notice: Subject to any disclaimer, the term of this patent is extended or adjusted under 35 U.S.C. 154(b) by 345 days.

(21) Appl. No.: 10/105,424

(22) Filed: Mar. 26, 2002

(65) Prior Publication Data

US 2003/0091894 A1 May 15, 2003

(30) Foreign Application Priority Data

Nov. 13, 2001 (TW) ........................................ 90219484 U

(51) Int. Cl.$^7$ .............................. H01M 2/06; H02J 7/00
(52) U.S. Cl. ........................... 429/98; 429/96; 429/100; 320/103
(58) Field of Search ................................ 320/103, 114; 429/96–100

(56) References Cited

U.S. PATENT DOCUMENTS

| | | | |
|---|---|---|---|
| 6,501,246 B2 * | 12/2002 | You et al. ................... | 320/114 |
| 6,528,969 B2 * | 3/2003 | Tung et al. ................. | 320/103 |
| 6,589,069 B1 * | 7/2003 | Liao ........................... | 439/501 |
| 6,709,784 B2 * | 3/2004 | Resch et al. ................ | 429/123 |

* cited by examiner

*Primary Examiner*—Carol Chaney

(57) ABSTRACT

A mobile phone battery includes a cover being provided at a predetermined position with an opening, positive and negative contacts located behind the cover and accessible via the opening of the cover for electrically connecting to a rectangular dry cell, and step-down means provided at an inner side of the cover and having a power output electrically connected to a power input of the mobile phone battery. An emergency charging of the mobile phone battery is possible simply by attaching a rectangular dry cell to the positive and the negative contacts of the mobile phone battery without using other battery charger.

4 Claims, 5 Drawing Sheets

MOBILE PHONE BATTERY

BACKGROUND OF THE INVENTION

The present invention relates to a mobile phone battery, and more particularly to a mobile phone battery that enables an emergency charging of the mobile phone simply with a general dry cell without the need of an additional battery charger.

Mobile communication has been playing an important role in the rapidly developed technological fields. Consumers place more reliance on mobile phones than ever. The mobile phone is characterized in the convenience it provides in electronic communication, and it enables a user to keep contact with others at any place and at any time. The mobile phone obtains its operating power from a battery that might run out of power and requires recharging through a charger. However, an outlet for an adapter of the charger to plug is not always available at any place, and a user would usually not carry an additional battery or batteries along with the mobile phone. When the mobile phone is battery low, particularly when it is used outdoors, the user could not help but watching the mobile phone to shut down automatically.

To solve the above problem, there is developed an emergency charger for a mobile phone user to charge a mobile phone battery with a general dry cell. Please refer to FIG. 1 that shows a conventional emergency charger 1 for charging a mobile phone 2, and to FIG. 2 that shows the use of the emergency charger 1 to charge the mobile phone 2 with a rectangular dry cell 3. As shown, the emergency charger 1 includes a connector 11 adapted to plug into a socket at a lower end of the mobile phone 2, and a charging base 12 connected to the connector 11. The charging base 12 is provided at one side surface with outward projected positive and negative contacts 121 in the form of two circles. One of the two contacts 121 is formed from a plurality of elastic curved segments, so that the two contacts 121 separately correspond to positive and negative contacts of the rectangular dry cell 3. When the dry cell 3 is attached to the positive and the negative contacts 121 on the charging base 12 of the emergency charger 1, the dry cell 3 is securely connected to the charging base 12. The charging base 12 is internally provided with a step-down means to change a direct current of 9V supplied by the dry cell 3 into a direct current having a voltage suitable for storing in the mobile phone battery. Direct current passing through the step-down means charges the mobile phone battery via the connector 11. In this manner, a mobile phone battery may be recharged with the emergency charger 1 and the rectangular dry cell 3 in the event there are not back-up battery and charger available for charging the mobile phone.

However, the conventional emergency charger 1 has dimensions almost equal to that of a normal mobile phone battery. It seemed to be more convenient to carry an additional mobile phone battery than an emergency charger 1 because a user carrying the mobile phone battery needs not to find a store for buying the dry cell 3. In brief, the conventional emergency charger 1 does not solve the problem of charging a mobile phone battery conveniently.

It is therefore desirable to develop a mobile phone battery that could be recharged with a general dry cell in an emergency without the need of other charger.

SUMMARY OF THE INVENTION

A primary object of the present invention is to provide a mobile phone battery that could be recharged simply with a general dry cell in an emergency without the need of other charger.

To achieve the above and other objects, the mobile phone battery of the present invention mainly includes a cover being provided at a predetermined position with an opening, positive and negative contacts located behind the cover and accessible via the opening of the cover for electrically connecting to a rectangular dry cell, and step-down means provided at an inner side of the cover and having a power output electrically connected to a power input of the mobile phone battery. With the above arrangements, an emergency charging of the mobile phone battery is possible simply by attaching a rectangular dry cell to the positive and the negative contacts of the mobile phone battery without using other battery charger.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
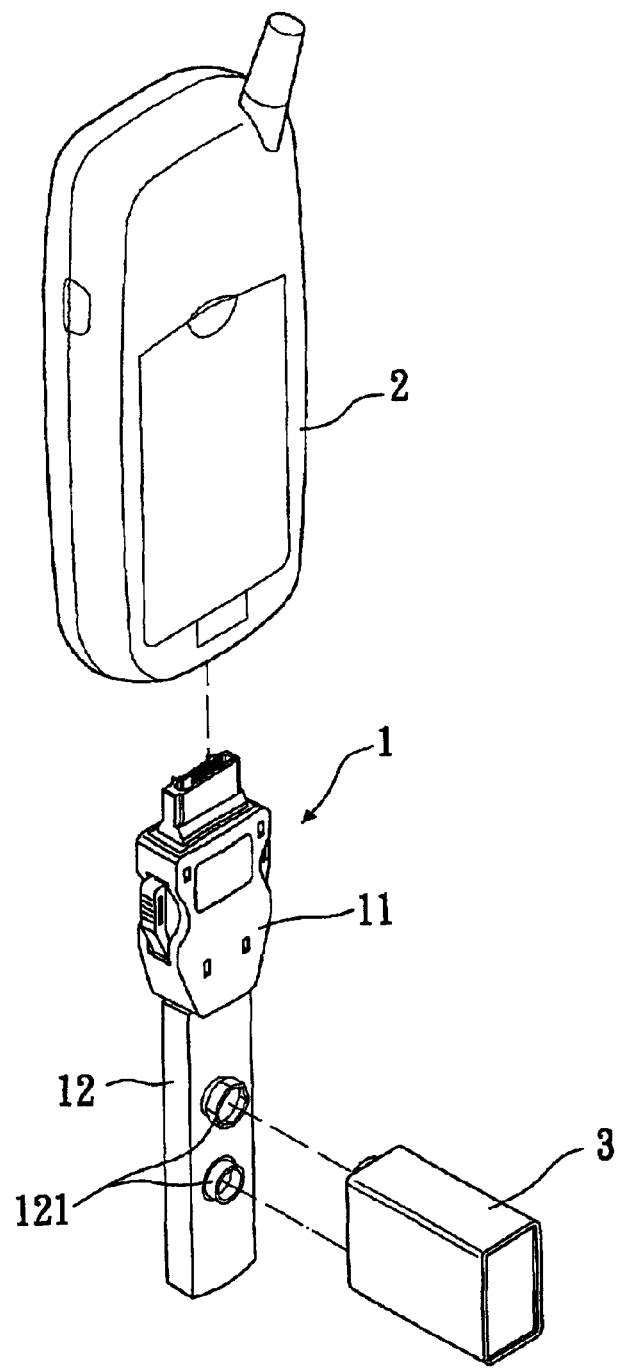
FIG. 1 shows a conventional emergency charger for charging a mobile phone.
Figure 2:
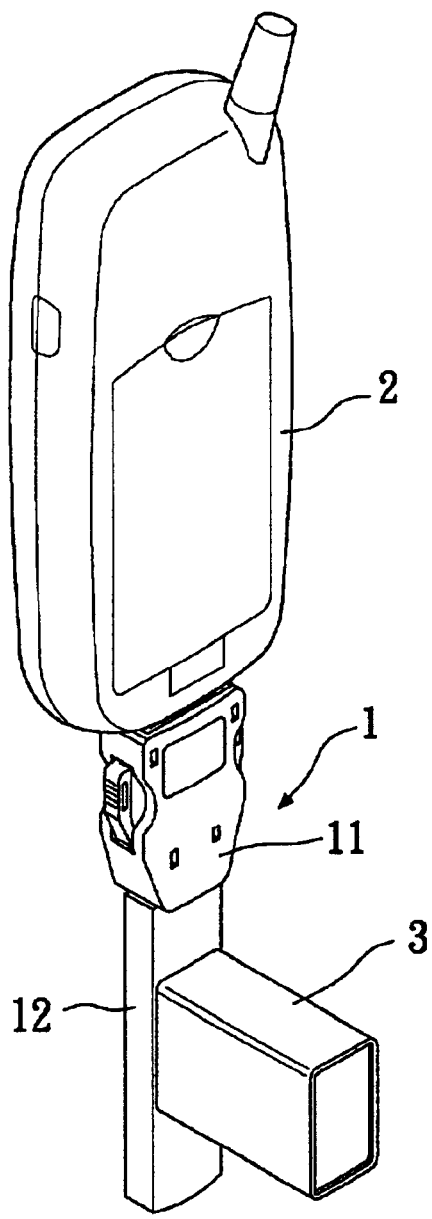
FIG. 2 shows the use of the emergency charger of FIG. 1 to charge the mobile phone with a dry cell.
Figure 3:
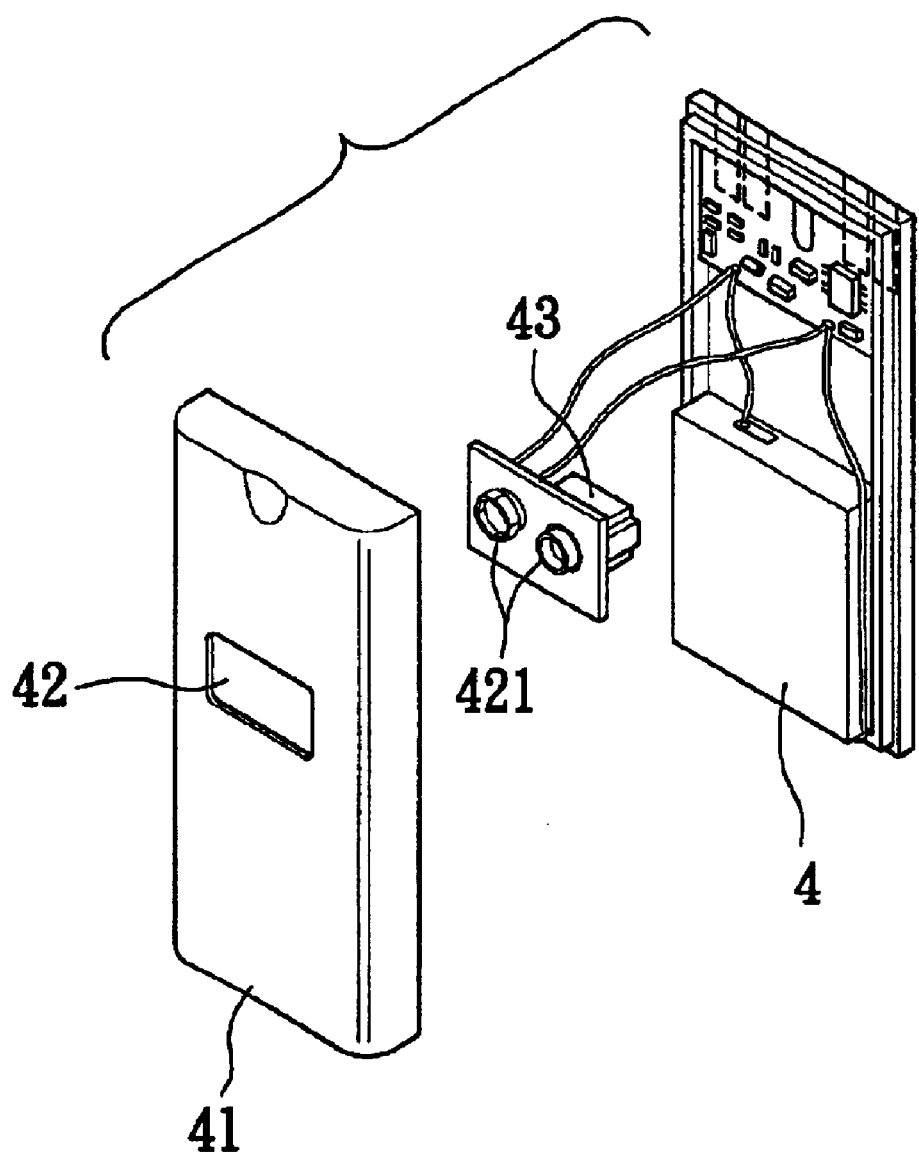
FIG. 3 is an exploded perspective view of a mobile phone battery according to the present invention.

Please refer to FIG. 3 that is an exploded perspective view of a mobile phone battery arrangement 4 according to the present invention. As shown, the mobile phone battery arrangement 4, which will be referred to as the battery 4 hereinafter for the purpose of simplicity, includes a cover 41 having an opening 42 formed at a predetermined position, round positive and negative contacts 421 located immediately behind the cover 41 and accessible via the opening 42, and step-down means 43 provided at an inner side of the cover 41. One of the two round contacts 421 is formed from a plurality of elastic curved segments and is electrically connected to the step-down means 43. The step-down means 43 has a power output electrically connected to a power input of a battery cell disposed behind the cover.

Figure 4:
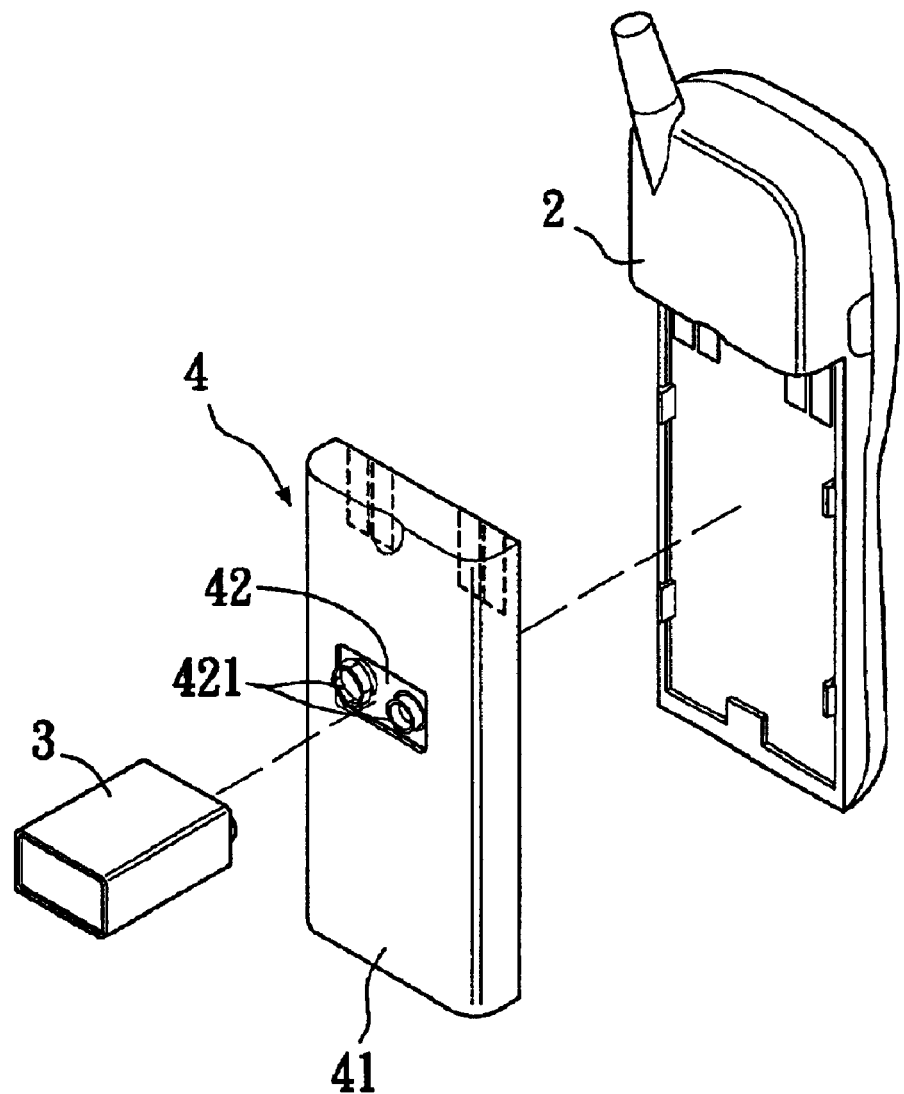
FIG. 4 shows the battery of FIG. 3 in an assembled state before connecting to a mobile phone and a rectangular dry cell.
Figure 5:
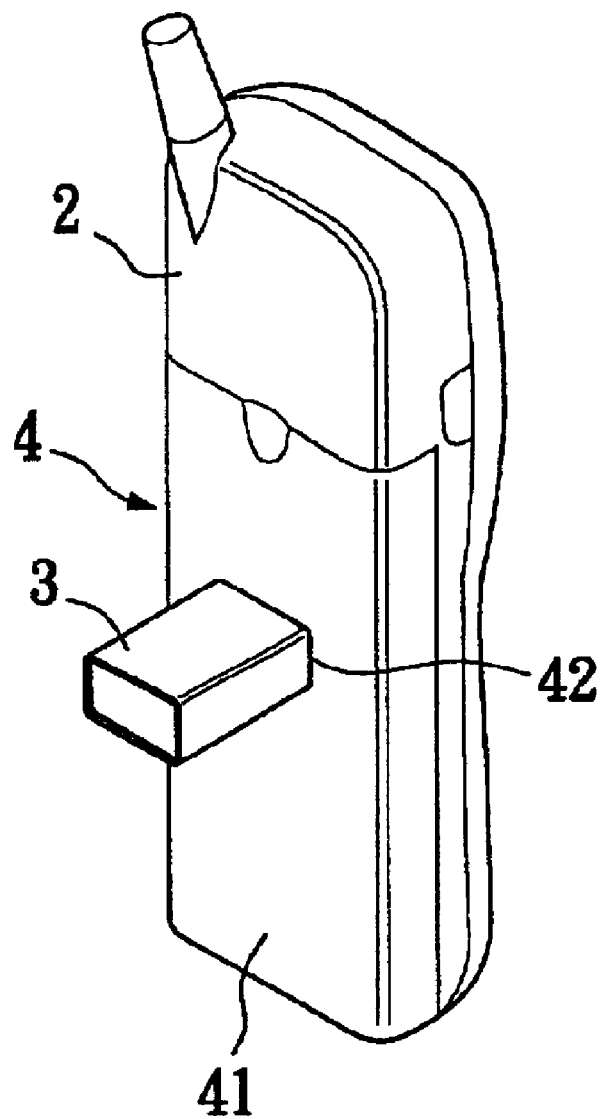
FIG. 5 shows the battery of FIG. 3 is connected to a mobile phone and charged through a rectangular dry cell.

Please refer to FIG. 4 that shows the battery 4 in an assembled state. As shown, the assembled battery 4 may be connected to a mobile phone 2 in a manner as specified by a mobile phone manufacturer, and a rectangular dry cell 3 may be connected to the battery 4 by plugging positive and negative contacts of the rectangular dry cell 3 onto positive and negative contacts 421, respectively, of the battery 4 via the opening 42. FIG. 5 shows the battery 4 has been attached to the mobile phone 2 with the rectangular dry cell 3 plugged onto the battery 4 via the opening 42. When the positive and the negative contacts of the rectangular dry cell 3 are firmly connected to the positive and the negative contacts 421 of the battery 4, the rectangular dry cell 3 is securely attached to the battery 4 at the opening 42 to charge the battery 4 immediately. In other words, the battery 4 may be directly charged with a general dry cell 3 to enable an emergency charging of the mobile phone 2 without using devices other than components originally supplied along with the mobile phone 2. To enable firm connection of the rectangular dry cell 3 to the battery 4 via the opening 42, the opening 42 is preferably a rectangular opening.

With the above-described arrangements, a user needs only to buy a rectangular dry cell 3 at a nearby store to charge the battery 4 when the latter is out of power. The user does not need to carry a battery charger along with the mobile phone 2 and the latter is therefore more convenient for use.

What is claimed is:

1. A mobile phone battery arrangement, which is attachable to a back of a mobile phone, and comprising:
   a cover being provided at a predetermined position with an opening;
   a mobile phone battery cell disposed behind said cover;
   positive and negative contacts located behind said cover and accessible via said opening of said cover for being directly attachable and electrically connectable to respective positive and negative terminals of a rectangular dry cell battery; and
   step-down means provided at an inner side of said cover and having a power output electrically connected to a power input of said mobile phone battery cell;
   whereby an emergency charging of said mobile phone battery cell is possible simply by directly attaching the positive and negative terminals of the rectangular dry cell battery to said positive and said negative contacts of said mobile phone battery arrangement without using a further battery charger.

2. The mobile phone battery arrangement as claimed in claim 1, wherein said opening formed on said cover is a rectangular opening.

3. The mobile phone battery arrangement as claimed in claim 1, wherein said rectangular dry cell battery is a 9-volt battery.

4. The mobile phone battery arrangement as claimed in claim 1, wherein said positive and negative contacts each have a round configuration, are spaced apart from each other, and are disposed on a common flat surface.

* * * * *